Nov. 14, 1933.　　　　K. G. DITTUS　　　　1,935,468
WINDOW ADJUSTMENT FOR COLLAPSIBLE VEHICLE TOPS
Original Filed Nov. 25, 1931　　2 Sheets-Sheet 1
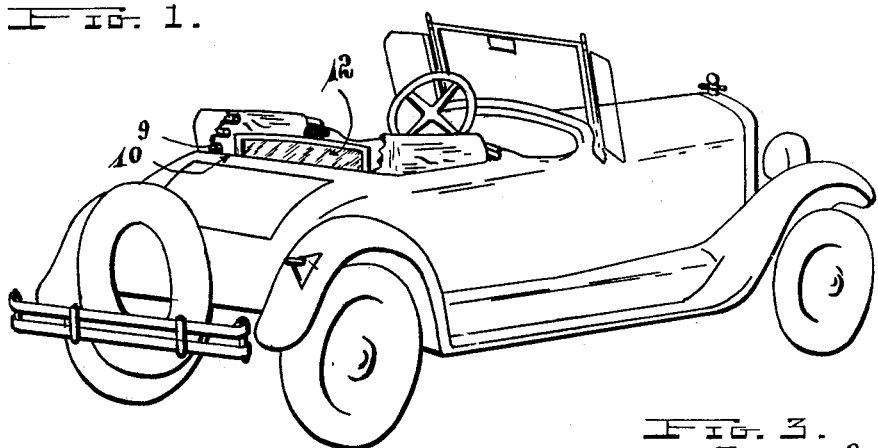
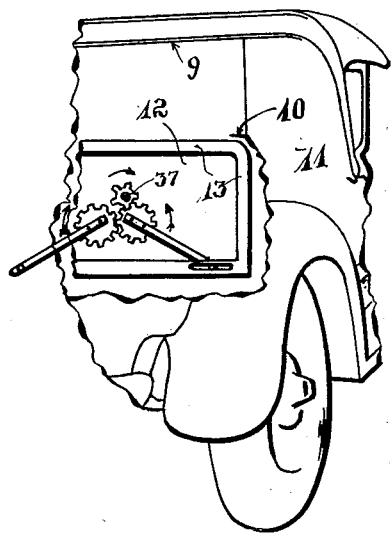
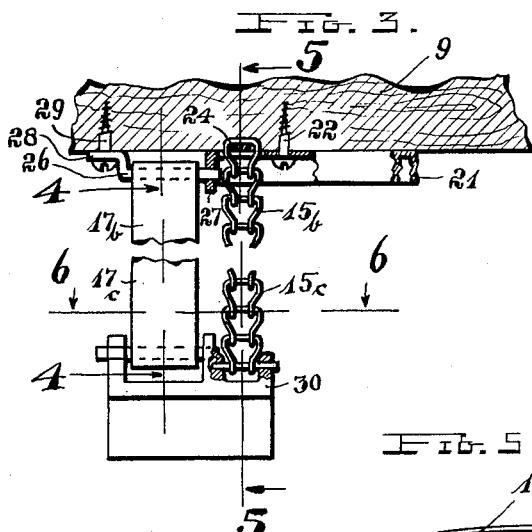
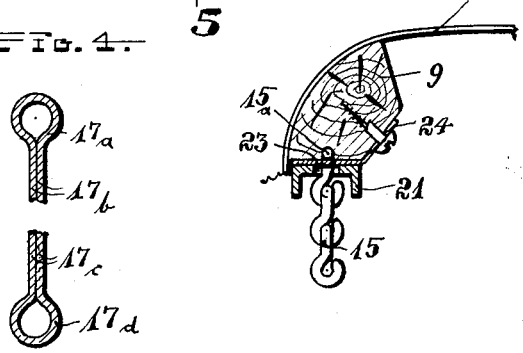
INVENTOR:
KARL G. DITTUS,
By: Otto H. Ringk,
his Atty Nov. 14, 1933.    K. G. DITTUS    1,935,468
WINDOW ADJUSTMENT FOR COLLAPSIBLE VEHICLE TOPS
Original Filed Nov. 25, 1931    2 Sheets-Sheet 2
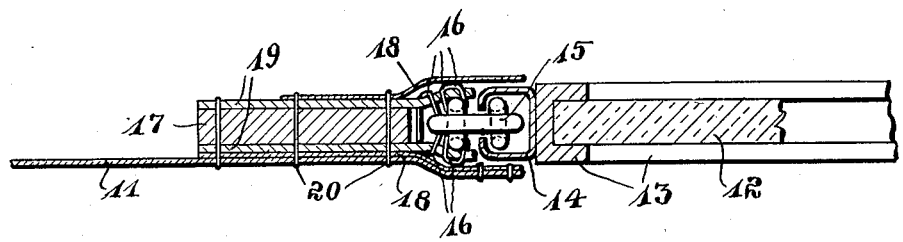
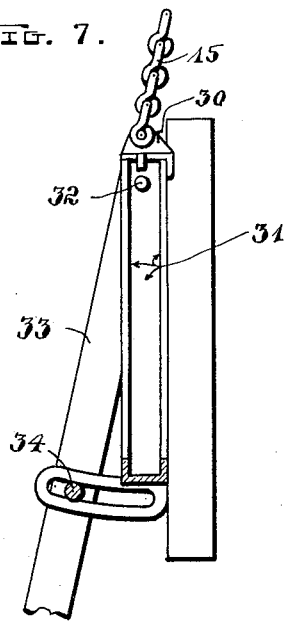
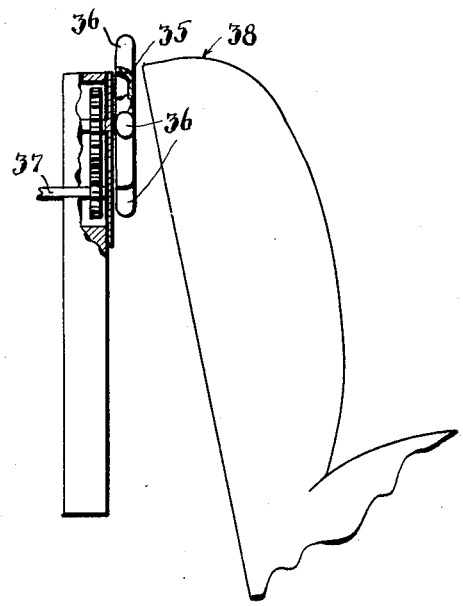
INVENTOR.
KARL G. DITTUS,
By: his Atty.

Patented Nov. 14, 1933

1,935,468

UNITED STATES PATENT OFFICE 1,935,468

WINDOW ADJUSTMENT FOR COLLAPSIBLE VEHICLE TOPS

Karl G. Dittus, Los Angeles, Calif., assignor of one-half to Fred W. Dittus, Berkeley, Calif.

Application November 25, 1931, Serial No. 577,303
Renewed September 15, 1933

2 Claims. (Cl. 296—48)

This invention relates to devices used for adjusting and controlling the window mounted in the framework of a vehicle, such as an automobile, with respect to the opening in a collapsible top.

One of the objects of this invention is to provide for a rigid window structure in a collapsible top.

Another object is to provide a guide and supporting frame for a rigidly constructed window swingably mounted in the framework of the vehicle adapted to facilitate a removal of the window in case of repair, regardless of the position of the top.

Another object is to provide operating means designed to be operative above the upholstery of the seat of an automobile.

Other objects will appear from the following description and appended claims as well as from the accompanying drawings, in which—

Fig. 1 is a perspective view of an automobile with the collapsible top folded down and partly broken away, to illustrate a shiftable window, slightly lifted, in its cooperative position as mounted in the framework or so-called body of the automobile.

Fig. 2 is a fragmentary perspective view of the auto with the top in its normal position over the auto, in which position the window structure of this invention can normally be shifted up and down with respect to the rear opening in the top.

Fig. 3 is a fragmentary front elevation of guide parts between the collapsible top and the auto-body.

Fig. 4 is an enlarged vertical cross section through the reinforcing strap on line 4—4 of Fig. 3.

Fig. 5 is a vertical cross section through the flexible guide for the window of this invention on line 5—5 of Fig. 3.

Fig. 6 is a fragmentary horizontal cross section through the shiftable window and the guiding and supporting parts between the collapsible top and the auto-body, approximately taken on line 6—6 of Fig. 3, having sealing material and cover of the top added over the illustration in Fig. 3.

Fig. 7 is a fragmentary side elevation of the swingable guide frame whereby the shiftable window can be removed past the collapsible top without a folding of it.

Fig. 8 is a fragmentary vertical cross section through the seat of an automobile, indicating operating mechanisms, to be reached behind and above the seat.

With collapsible tops, as used with so-called "roadsters", windows are normally of flexible or soft material, which, as a rule, is not very durable.

The principal object of this invention, recited above, involves therefore a substitution of the rigid window structure of this invention for such a flexible window of the customary collapsible top.

However, though the window structure itself is of a rigid form, all the parts of the guide for the window, as far as such parts are between the collapsible top and the framework or body of the automobile, in this new arrangement as a whole structure, are of a flexible form, to fold with the collapsible top of the automobile, when the window is in its lowermost disappearing position.

When the collapsible top is in its raised or stretched position as illustrated in Fig. 2, the flexible parts of the guide for the window are also stretched between the edge indicated at 9 and the top-edge of the body indicated at 10, so as to be rigid enough to properly guide the window over the length between the body from its disappearing position in the body to closing position in the stretched top, between the two side flaps of which one is indicated at 11, these side flaps being worked up and arranged so as to enclose the flexible guide-parts.

A rough outline is illustrated in Fig. 6 of the interengagement between the rigid window and the flexible guide-parts between the collapsible top and the auto-body. The window-pane 12, mounted in the frame 13, is provided with a channeled edge-member 14, to slidingly engage with a chain 15.

This chain forms the flexible guide for the window and is suitably secured to the collapsible top.

The securing, in the first place, involves that this portion of the guide should move with the top when this is folded down or when it is raised to stretched position so as to not flop around independently of the movements of the top and also to have imparted to the flexible guide a certain stiffness provided by the reinforcements in the back of the top. As is obvious from the illustration in Fig. 6, the chain is secured to the reinforcements by a stitching indicated at 16.

Besides an extra strong strap 17, the reinforcements in the upright edge of the flap 11 embody and include sealing strips 18, and the strips 19 to which the chain is secured, all united by further stitchings as indicated at 20. The sealing strips 18 serve slide and rest over the sides of the channel-member 14 so as to make the joint between the window and the top in the side flaps 11 as water and air tight as possible, even so for the sake of illustration of the distinct parts a space has been left between the sealing strips and the channel-members.

Though certain straps and strips and parts have been illustrated and recited it must be understood that I do not limit myself to this particular manner of arrangement and that this arrangement has merely been shown to explain one certain possibility of providing a flexible guide in the collapsible top properly secured and sealed, and that slightly different details may be used within the scope of this invention.

Having stated above that the chain is in stretched position between the top and the auto-body when the top is stretched, the additional strap 17 is designed to also be stretched at the same time between the edge 9 and at suitable points along the line indicated at 10.

The further and principal securing of the chains in conjunction with the reinforcing straps on the opposite upright sides of the window, to assure tightly stretched though flexible guides, rests therefore in the provisions made for firmly attaching the ends of the chains and straps 17.

This is illustrated in Figs. 3, 4 and 5 in detail. The collapsible or foldable top is customarily provided with a solid edge-material of wood, of eventually the form illustrated in cross section at $9_a$ in Fig. 5, as a part of the supporting members over which the top is stretched.

A bar 21 of U-shaped cross section, into which the top-edge of the shiftable window may slip in its uppermost closing position, is secured to this edge-member $9_a$ by screws 22, indicated in Fig. 3. This bar is provided with apertures 23 through which the end-link $15_a$ of the chain is slipped, to be held in this position by a narrow strip of sheet material 24 for each of the chains at the opposite upright sides or ends of the window, each of these strips being in turn held in position by the screw 25.

Pins 26 are each inserted with one end into an end-flange 27 of the bar 21 and having their other ends secured to the edge-member $9_a$ by additional screws 29, by which the loop-like upper terminations of each of the straps, indicated at $17_a$ in Fig. 4, from the edge-member $9_a$ in the manner illustrated in Fig. 3, the downward extending portions of the strap and chain being indicated at $17_b$ and $15_b$ respectively.

A bracket 30 serves to connect the lower ends of the straps 17 and of the chains 15 from which they extend upwardly in the manner indicated at $17_c$ and $15_c$ respectively.

This bracket is preferably mounted on a support and adjusting mechanism that is pivotally disposed within the auto-body, the adjusting mechanism including a rigid guide structure for the window, to facilitate a setting and adjustment for aligning this guide and thereby the window in the direction towards the edge 9 of the collapsible top.

A collapsible top, in the first place, may vary slightly on different cars even when new, and, secondly, to allow for a stretching of the straps, or chains, or the material of any top, this adjustment for the window, to align with the top, is practically a necessity.

In Fig. 7, a short piece of chain is shown stretched in a direction out of alignment with the channel-guide member 31, from which it will be clear that a window disposed shiftable in this guide-member would not readily raise from its disappearing position in this guide over to the chain 15. However having the channel-member 31 pivotally engaged at 32 to a suitable part of an auto-body or to a separate attachment-piece 33 by which this whole structure can be attached to the auto-body this guide-channel can be adjusted to different slanting positions to always align with the collapsible top, and, in such adjusted position, this guide can be held in position at 34.

Inasmuch as this whole structure is principally intended for the rear window in a collapsible top, in which case the operating mechanism would normally come behind the back of a seat so that the customary handle device could not very well be applied in the normal manner, the extension cap 35 with a number of handle fingers 36 is preferably geared to the customary operating shaft 37 of the window lifting device, bringing the fingers 36 above the top 38 of the back of the seat.

Having thus described my invention, I claim:

1. In combination with the back of a vehicle and a collapsible top, a window shiftably mounted to disappear in said back of the body of the vehicle, and flexible guiding means interposed between the said back of the body and said top and tightly joined longitudinally with the upright edge of the top embodying sealing means for the window by which the said window can be guided into closing position sealed off with respect to the said top.

2. In combination with a collapsible top of a vehicle and a window shiftable with respect to the top, a flexible guide applied to said top to become tight with the stretched top to guide said window to closing position with respect to said top, and an adjustable guide within said vehicle for said window in disappearing position to be adjustable into alignment with the flexible guide.

KARL G. DITTUS.